United States Patent [19]

Kawasumi et al.

[11] Patent Number: 5,683,500
[45] Date of Patent: Nov. 4, 1997

[54] AQUEOUS INK COMPOSITIONS AND METHODS FOR THEIR PRODUCTION

[75] Inventors: Toshimitsu Kawasumi; Hiroshi Inoue; Toshihiro Sawaki; Keiko Nakamura; Hiroyuki Fukui; Yoshiko Yamaoka, all of Osaka, Japan

[73] Assignee: Sakura Color Products Corporation, Osaka, Japan

[21] Appl. No.: 577,543

[22] Filed: Dec. 22, 1995

[30] Foreign Application Priority Data

Dec. 28, 1994 [JP] Japan .................... 6-341089

[51] Int. Cl.$^6$ .................................... C09D 11/16
[52] U.S. Cl. ............... 106/20 R; 106/20 A; 106/22 B; 106/25 R; 106/26 R; 106/22 F
[58] Field of Search ............... 106/20 R, 20 A, 106/23 B, 22 B, 25 R, 26 R, 23 F, 22 F

[56] References Cited

U.S. PATENT DOCUMENTS

| | | | |
|---|---|---|---|
| 4,629,748 | 12/1986 | Miyajima et al. | 106/20 A |
| 5,547,499 | 8/1996 | Kawasumi et al. | 106/20 R |
| 5,561,175 | 10/1996 | Imagawa | 106/20 A |

*Primary Examiner*—Helene Klemanski
*Attorney, Agent, or Firm*—Armstrong, Westerman, Hattori, McLeland & Naughton

[57] ABSTRACT

An aqueous ink is provided which comprises a coloring agent, a water-soluble solvent and water, where the amount of gas dissolved therein is less than the amount of gas present at the situation level. Where the aqueous ink composition is used for a writing instrument of ink-free type having a confined ink chamber structure, the writing instrument rarely causes ink leakage and writing defects such as uneven ink density and skips in a drawn line, even if it is allowed to stand at a high temperature or to stand for a long time.

20 Claims, 2 Drawing Sheets

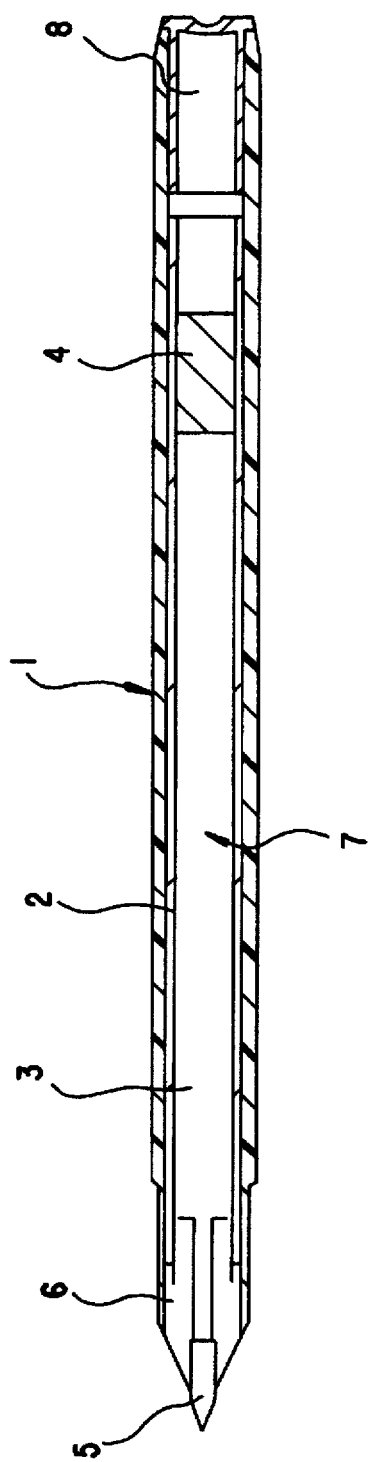
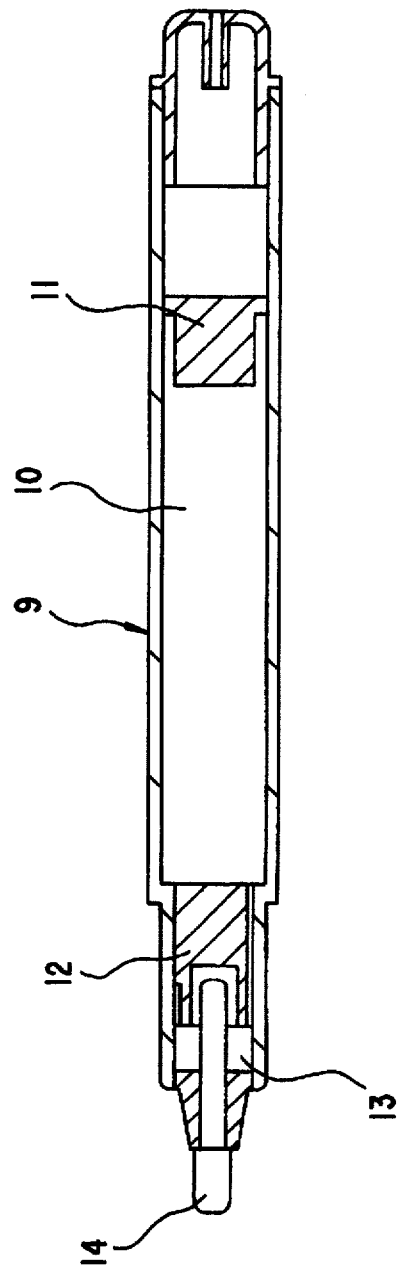
FIG.1
FIG.2

AQUEOUS INK COMPOSITIONS AND METHODS FOR THEIR PRODUCTION

BACKGROUND OF THE INVENTION

1. Field of the invention

The present invention relates to an aqueous ink composition and, more particularly, to an aqueous ink composition for use in a writing instrument, of ink-free type (direct-ink-supply type) having a confined ink chamber structure such that the interior of an ink chamber thereof is sealed off from the exterior and a back-flow preventive member fitted into the tail end of the ink chamber is adapted to move toward a pen tip thereof as the ink contained in the ink chamber is consumed. Particularly, the invention relates to an aqueous ink composition which is free from evolution of bubbles which would typically occur therein due to temperature change or with the lapse of time.

2. Description of the Related Art

A writing instrument of ink-free type as shown in FIG. 1 has a housing 1, an ink container tube 2 made from a material such as polypropylene which is directly charged with aqueous ink 3 and installed in the housing 1. A back-flow preventive member 4 is fitted into the tail end of the ink container tube 2, a pen tip 6 is attached at the leading end of the ink container tube 2 and has a writing tip 5 which is made of a material such as German silver or stainless steel. The writing instrument has an ink chamber 7 and a tail cap 8.

The ink chamber 7 of the writing instrument of this type has a confined structure such that the interior thereof is sealed off from the exterior and the back-flow preventive member 4 is adapted to move toward the pen tip as the ink contained therein is consumed. The back-flow preventive member 4 is made of a base material such as polybutene or a material obtained by gelatinizing such a base material with a gelatinizer. Alternatively, the back-flow preventive member 4 may be made of a rubber or elastomer having the same property as the aforesaid materials.

FIG. 2 is a sectional view illustrating another exemplary writing instrument of ink-free type having a confined ink chamber structure. The writing instrument has an ink container 9 made of a material such as polypropylene directly charged with aqueous ink 10, a back-flow preventive member 11 made of a material having substantially the same property as that of the aforesaid back-flow preventive member 4 and fitted into the tail end of the ink container 9. The writing instrument also has a valve mechanism 12 provided on the pen tip side for generating a negative pressure in a valve chamber 13 to supply the aqueous ink 10 to a pen tip 14 and allow the back-flow preventive member 11 to move in the ink container 9 toward the pen tip as the aqueous ink 10 is consumed. The aforesaid writing instruments of ink-free type both have a confined ink chamber structure such that the interior of the ink chamber is sealed off from the exterior.

An exemplary aqueous ink composition conventionally used as the aqueous ink to be filled into the ink containers of such writing instruments typically is prepared by adding (i) a water-soluble organic solvent such as polyvalent alcohol or a derivative thereof and water and, as required, an aqueous solution of a tackifier such as a water-soluble resin or natural polysaccharide, to (ii) an aqueous solution of a coloring agent such as a water-soluble dye, pigment or colored resin emulsion.

However, when a writing instrument of the ink-free type having the confined ink chamber structure which is charged with such an aqueous ink composition is allowed to stand in a high-temperature place such as inside an automobile in summer or at a temperature higher than a temperature at which the writing instrument is fabricated, or allowed to stand for a long time, ink leakage or writing defects such as uneven ink density and skips in a drawn line may occur.

In order to overcome the aforesaid drawbacks of the ink-free type writing instruments having the confined ink chamber structure, it is an object of the present invention to provide an aqueous ink composition which prevents the occurrence of writing defects such as uneven ink density and skips in a drawn line even if a writing instrument charged with the aqueous ink is allowed to stand at a high temperature or to stand for a long time.

SUMMARY OF THE INVENTION

In accordance with the objections of the present invention, there is provided an aqueous ink comprising a coloring agent, a water-soluble organic solvent and water, whereby the amount of gas dissolved therein is less than at a saturation level.

It is an additional object to provide a method of producing an aqueous ink composition comprising mixing at least a coloring agent, a water-soluble organic solvent and water, and then permitting the mixture to stand at a reduced pressure for a period of time sufficient to reduce the amount of gas dissolved in the mixture to less than its saturation level. In addition, there is provided a method of producing an aqueous ink composition comprising mixing at least a coloring agent, a water-soluble organic solvent and water, and then adding to the mixture a compound capable of chemically reacting with dissolved gases to reduce the amount of gas dissolved in the mixture to less than its saturation level.

It is an additional object of the present invention to provide a writing instrument of the ink-free type whereby the writing instrument comprises an ink chamber which includes an ink composition comprising at least a coloring agent, a water-soluble solvent and water. The amount of gas dissolved in the ink composition is less than the amount of gas at a saturation level of the gas.

BRIEF DESCRIPTION OF THE DRAWINGS

FIG. 1 is a sectional view illustrating one exemplary writing instrument of the ink-free type having a confined ink chamber structure;

FIG. 2 is a sectional view illustrating another exemplary writing instrument of the ink-free type.

DETAILED DESCRIPTION OF THE PREFERRED EMBODIMENTS

Figure 3:
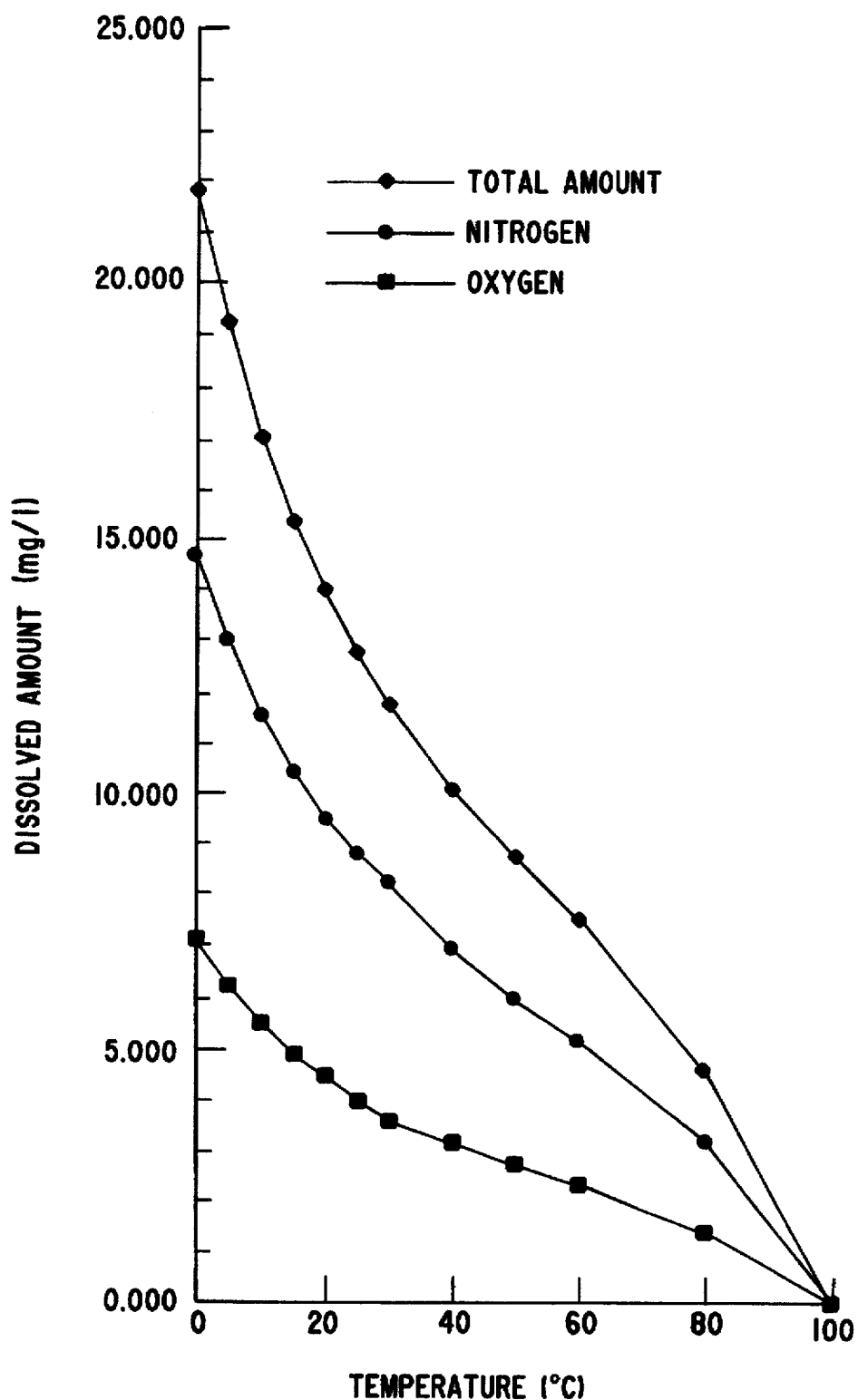
FIG. 3 is a graphical representation illustrating the solubility curves of oxygen gas and nitrogen gas in water.

The present invention will hereinafter be detailed.

Throughout this description, the phrase "the amount of gas dissolved in the aqueous ink composition is less than at a saturation level" denotes a situation where the amount of gas dissolved in the ink composition is less than the amount of gas that would normally be dissolved in the ink composition at or about room temperature, which is usually called by those skilled in the art as the saturation level of gas. Throughout this description, the "gas" referred to above denotes any gas that is typically present in a conventional ink composition, including, but not limited to, oxygen and nitrogen, and the like.

An aqueous ink of the present invention comprises a coloring agent, a water-soluble organic solvent and water, whereby the amount of gas dissolved therein is less than at a saturation level.

The amount of gas dissolved in the aqueous ink composition of the invention is preferably less than about 3 mg/l as measured on the basis of the amount of dissolved oxygen gas at 20° C., but not limited thereto, as long as the dissolved gas amount is less than the saturation level.

The aqueous ink composition of the present invention is particularly suitable for writing instruments of the ink-free type having a confined ink chamber structure as well as for writing instruments having an unconfined ink chamber structure. A writing instrument of the ink-free type charged with the aqueous ink will not suffer from the evolution of bubbles in the ink which would occur due to temperature change or with the lapse of time. Therefore, writing defects such as uneven ink density and skips in a drawn line can be prevented because bubbles do not flow out of the writing tip of the writing instrument even if the writing instrument is allowed to stand for a long time. Further, since the evolution of gas in an ink chamber of the writing instrument is prevented, ink leakage can be prevented which would occur due to the expansion of evolved gas.

The inventor's of the present invention have found it important to reduce the amount of gas dissolved in the ink to less than the saturation level, on the following basis.

The inventors intensively studied the causes of ink leakage and writing defects such as uneven ink density and skips in a line drawn with a writing instrument of the ink-free type having a confined ink chamber structure which had been allowed to stand at a high temperature or to stand for a long time. While not intending to be bound by any theory, the findings of the inventiors are that, while the writing instrument is allowed to stand at a high temperature or to stand for a long time, water in the ink evaporates and, as a result, the solubility of gas in the ink is reduced. For this reason, gas including oxygen, nitrogen and the like can no longer be dissolved in the ink and the undissolved gas evolves in an ink chamber and/or a writing tip of the writing instrument especially in ink-free type writing instruments having a confined chambers. The gas flowing out of the writing tip causes the writing defects such as uneven ink density and skips in a drawn line. The gas present in the ink chamber expands therein and causes the ink leakage. That is, these problems are unique to writing instruments of ink-free type having the confined ink chamber structure.

Where an ink containing oxygen dissolved therein in an amount of greater than about 6 mg/l, which typically is nearly equal to an oxygen saturation level at 20° C., is filled into ink-free containers of writing instruments such as those shown in FIGS. 1 and 2 and the writing instruments are allowed to stand at a high temperature, the evolution of bubbles of oxygen gas which has been dissolved in the ink causes the writing defects such as uneven ink density and skips in a drawn line. This is because the oxygen gas saturation level is reduced with an increase in temperature, as shown in FIG. 3 which is a graphical representation illustrating the relation between the temperature and gas amounts dissolved in water (the amounts of dissolved oxygen and nitrogen, and the total amount of dissolved gas). This phenomenon is also observed when water in the ink evaporates while the writing instrument is allowed to stand for a long time. As shown in FIG. 3, this tendency is more remarkable in the case of nitrogen gas. Gases such as oxygen and nitrogen dissolved in the ink heavily influence the degradation of the ink due to the temperature change and time lapse, which further influences the writing performance.

In view of the foregoing, it has been found that an ink composition comprising a coloring agent, a water-soluble organic solvent and water wherein the amount of gas dissolved therein is reduced to less than a saturation level can prevent the evolution of bubbles in the ink and hence, the occurrence of the writing defects such as uneven ink density in a drawn line, which would otherwise occur due to a temperature change or with the lapse of time. In particular, an ink composition in which the dissolved gas amount is preferably less than about 3 mg/l as measured on the basis of dissolved oxygen amount at an average use temperature of 20° C. can successfully overcome the aforesaid problems.

To reduce the dissolved gas amount to less than a saturation level, preferably, to about 3 mg/l or less, as measured on the basis of dissolved oxygen amount at 20° C., the ink composition is allowed to stand, for example, at 20° C. under a reduced pressure, preferably a pressure of less than about 20 mmHg before being filled into a writing instrument. Thus, bubbles of gas such as oxygen which have been dissolved in the ink composition expand and evolve from the ink, so that the dissolved gas amount preferably can be reduced to less than about 3 mg/l, as measured on the basis of dissolved oxygen amount at 20° C. Alternatively, oxygen, nitrogen and other gases dissolved in the ink composition can be removed by adding to the composition a compound capable of chemically reaction and/or combining with these gases. The method of reducing the dissolved gas amount to less than the saturation level or preferably to less than about 3 mg/l as measured on the basis of dissolved oxygen amount at 20° C. is not limited to the aforesaid methods.

The coloring agent to be used in the present invention may be any of various kinds of coloring agents which include water-soluble dyes and pigments as long as the coloring agents are capable of forming a color in an aqueout system.

Water-soluble dyes to be used in the present invention may be any of those commonly used for an aqueous ink composition, and examples thereof include acid dyes such as C. I. Acid Red 87, Acid Orange 56, Acid Violet 49 and Acid Blue 9; direct dyes such as C. I. Direct Yellow 50 and Direct Black 19; and basic dyes such as C. I. Basic Blue 9, Basic Red 1 and Basic Yellow 35. These dyes may be used either alone or in combination.

Pigments to be used in the present invention include any of known pigments commonly used for an aqueous ink composition, and examples thereof include organic pigments such as azo-type, condensed polyazo-type, phthalocyanine-type, quinacridone-type, anthraquinone-type, dioxazine-type, indigo-type, thioindigo-type, perinone-type, perylene-type and melamine-type pigments; inorganic pigments such as titanium oxide, iron oxide and carbon black; and colored resin emulsions such as those prepared by coloring an aqueous dispersion of fine polymer particles of an average particle diameter of from about 0.1 µm to about 1 µm obtained by emulsion polymerization of one or more resins selected from styrene resins, acrylic resins and acrylonitrile resins with a basic dye or fluorescent basic dye and/or a fluorescent brightener. These may be used either alone or in combination.

The amount of the coloring agent to be used is preferably in the range of between about 1% and about 30% by weight, more particularly between about 3% and about 15% by weight with respect to the total weight of the ink composition. When the colored resin emulsion is used, the amount thereof is preferably in the range between about 10% and about 50% by weight with respect to the total weight of the ink composition. If the amount of coloring agent or colored resin emulsion is less than the aforesaid range, the ink density on paper can be undesirably reduced. On the other hand, if the amount thereof is greater than the aforesaid range, the resultant ink composition can have an increased viscosity and, hence, can deteriorate writing smoothness. Those skilled in the art are capable of determing the appropriate amount of coloring agent or colored resin emulsion, using the guidelines provided herein.

If a pigment is used as the coloring agent, a pigment dispersant usually is added to the ink composition. The pigment dispersant comprises at least one selected from generally used water-soluble resins, surface active agents and the like. Although the water-soluble resins may be selected from natural resins, semi-synthetic resins and synthetic resins, the synthetic resins are the most preferable in terms of fungi- and rot-resistance and viscosity characteristics of the ink compositions for writing instruments. Examples of useful synthetic resins include, but are not limited to alkali-water-soluble resins such as polyacrylic acid resins, polymaleic acid resins, styrene-acrylic acid copolymers and styrene-maleic acid copolymers, water-soluble styrene resins, polyvinyl pyrrolidone, polyvinyl alcohol and water-soluble urethane resins. The surface-active agent for use in the present invention can include any one selected from anionic surface-active agents, cationic surface-active agents, nonionic surface-active agents and ampholytic surface-active agents. The amount of these pigment dispersants preferably is in the range between about 0.05 parts and about 2 parts by weight with respect to 1 part by weight of the pigment. If the amount is less than the aforesaid range, the dispersion stability of the pigment can be reduced. On the other hand, if the amount is greater than the aforesaid range, the resultant ink composition can have an increased viscosity and, hence, can deteriorate writing smoothness. The skilled artisan is capable of determining the appropriate amount of pigment dispersant, based on the guidelines presented herein.

Examples of water-soluble Organic solvents useful in the invention include, but are not limited to polyvalent alcohols such as ethylene glycol, diethylene glycol, propylene glycol and glycerin; glycol ethers such as propylene glycol monomethyl ether; and glycol ether esters such as propylene glycol monomethyl ether acetate. These solvents may be used either alone or as a mixture. The amount of such water-soluble organic solvents is preferably in the range between about 1% and about 40% by weight with respect to the total weight of the ink composition. If the amount thereof is less than about 1% by weight, too much water can evaporate from the ink chamber, thereby promoting the evolution of bubbles in the ink composition. On the other hand, if the amount thereof is greater than about 40% by weight, the resultant ink composition can have an increased viscosity and, hence, can deteriorate the writing smoothness and may dry too slowly when applied on paper.

As required, the ink composition may contain an appropriate pseudo plasticity formation agent, pH adjuster, lubricant, rust-preventive agent, antiseptic agent, antifungal agent and the like. Usable as the pseudo plasticity formation agent include, but are not limited to water-soluble polymers such as natural polysaccharides, semi-synthetic cellulosic polymers and polyalkylene glycol. More specifically, exemplary natural polysaccharides to be used include guar gum, locust bean gum, weran gum, rhamzan gum, xanthane gum and the like, which have polymeric structures that can be obtained by polymerization of monosaccharides such as glucose, galactose, rhamnose, mannose and a glucuronic acid salt. Among these, weran gum and xanthane gum are particularly preferable. Alkali salts of crosslinked acrylic acid polymers can also be used as the pseudo plasticity formation agent. Examples of useful pH adjusters include, but are not limited to caustic soda, sodium carbonate, alkanolamine and ammonia. Useful lubricants include, but are not limited to nonionic surface-active agents such as polyoxyethylene alkyl phenyl ether, surface-active agents of alkali and alkanolamine salts of fatty acids, fluorinesbased surface-active agents, and polyoxyethylene alkylphosphate-based surface-active agents. Examples of useful rust-preventive agents to be used include, but not limited to, benzotriazole, derivatives thereof, and dicyclohexylammonium nitrate. Examples of useful antiseptic agents include, but are not limited to potassium sorbate, sodium benzoate, pentachlorophenylsodium, sodium dihydroacetate and 1,2-benzisothiazoline-3-on. Among these, 1,2-benzisothiazoline-3-on is particularly preferable.

The aforementioned additives such as pseudo plasticity formation agent, pH adjusters, lubricants, rust-preventive agents, antiseptic agents, antifungal agents can be used alone or in combination with one another. Those skilled in the art are capable of determining which additives are useful, and the amount of additives to use in accordance with the guidelines provided herein.

The aqueous ink compositon of the present invention comprises a coloring agent, a water-soluble organic solvent and water, whereby the amount of gas dissolved therein is less than at a saturation level, particularly less than about 3 mg/l as measured on the amount of dissolved oxygen at 20° C. Where the aqueous ink composition is used for a writing instrument of the ink-free type having a confined ink chamber structure, the evolution of bubbles in the ink can be prevented which normally would occur due to temperature change or with the lapse of time. Therefore, the writing instrument, even if allowed to stand for a long time, does not suffer from the outflow of bubbles from a pen tip thereof, so that the writing defects such as uneven ink density and skips in a drawn line can be prevented. Further, gas does not evolve in an ink chamber of the writing instrument and, hence, ink leakage due to the expansion of gas in the ink chamber can be prevented.

The present invention also provides a method of preparing an ink composition whereby the ink composition has a reduced amount of dissolved gas. That is, the amount of gas present in the ink composition is lower than the saturation level, and preferably, is below about 3 mg/l as measured on the basis of the amount of dissolved oxygen at an average temperature of about 20° C. In accordance with the method, at least a coloring agent, a water-soluble organic solvent and water are mixed together, and then the mixture is permitted to stand at a reduced pressure for a period of time sufficient to reduce the amount of gas dissolved in the mixture to less than its saturation level. In addition, the method of making an aqueous ink composition of the present invention comprises mixing at least a coloring agent, a water-soluble organic solvent and water, and then adding to the mixture a compound capable of chemically reacting with dissolved gases to reduce the amount of gas dissolved in the mixture to less than its saturation level. Those skilled in the art are capable of determining the appropriate compound to add to the mixture that is capable of reacting with the appropriate dissolved gases to reduce the amount of gas in the mixture.

The present invention also provides an ink-free type writing instrument (referring to FIG. 1) comprising a housing 1, an ink container tube 2, made of a material such as polypropylene and installed in the housing 1, whereby the tube 2 is directly charged with an aqueous ink composition 3. The ink composition 3 includes at least a coloring agent, a water-soluble solvent and water, whereby the amount of gas dissolved in the ink composition is less than the amount of gas at a saturation level of the gas. The writing instrument also has a back-flow preventive member 4 fitted into the tail end of the ink container tube 2, a pen tip 6 attached at the leading end of the ink container tube 2, a writing tip 5, an ink chamber 7 and a tail cap 8.

The present invention further provides a writing instrument (referring to FIG. 2) of the ink-free type which includes an ink container 9 made of a material such as polypropylene which is directly charged with an aqueous ink composition 10. The ink composition 10 includes at least a coloring agent, a water-soluble solvent and water, whereby the amount of gas dissolved in the ink composition is less than the amount of gas at a saturation level of the gas. A back-flow preventive member 11 also is provided and is fitted into the tail end of the ink container 9. The writing instrument also can include a valve mechanism 12 provided on the pen tip side for generating a negative pressure in a valve chamber 13 to supply the aqueous ink composition 10 to a pen tip 14 and allow the back-flow preventive member 11 to move in the ink chamber 9 toward the pen tip 14 as the aqueous ink composition is consumed.

Those skilled in the art recognize that the aqueous ink compositions of the present invention can be used in other writing instruments, and are capable of fabricating such writing instruments with the inventive ink compositions using the guidelines provided herein.

The present invention now will be described by reference to the non-limiting examples below.

EXAMPLES

FIG. 1 is a sectional view of one exemplary writing instrument of the ink-free type having a confined ink chamber structure (so-called ball-point pen) as previously described. Referring to FIG. 1, the writing instrument has a housing 1, an ink container tube 2 made of a material such as polypropylene, directly charged with aqueous ink 3 and installed in the housing 1. The writing instrument also has a back-flow preventive member 4 fitted into the tail end of the ink container tube 2, a pen tip 6 attached at the leading end of the ink container tube 2 and a writing tip 5 made of German silver or stainless steel fitted therein, an ink chamber 7 and a tail cap 8. Aqueous inks of Examples 1 to 6 and 13 were each directly filled into the ink container tube 2 of the writing instrument of the ink-free type having such a construction.

As previously described, the writing instrument has a confined ink chamber structure such that the interior of the ink chamber 7 is sealed off from the exterior and the back-flow preventive member 4 is adapted to move toward the pen tip as the ink contained in the ink container tube is consumed. The back-flow preventive member is made of a base material such as polybutene or a material obtained by gelatinizing such a base material with a gelatinizer. Alternatively, the back-flow preventive member may be made of a rubber or elastomer having the same property as the aforesaid material.

FIG. 2 is a sectional view illustrating another exemplary writing instrument of the ink-free type having a confined ink chamber structure. The writing instrument has an ink container 9 made of a material polypropylene directly charged with aqueous ink 10, a back-flow preventive member 11 made of a material having substantially the same property as that of the aforesaid back-flow preventive member and fitted into the tail end of the ink container 9, a valve mechanism 12 provided on the pen tip side for generating a negative pressure in a valve chamber 13 to supply the aqueous ink 10 to a pen tip 14 and allow the back-flow preventive member 11 to move in the ink container 9 toward the pen tip 14 as the aqueous ink 10 is consumed. Aqueous ink compositions of Examples 7 to 12 were each directly filled into the ink container 10 of a writing instrument having such a construction.

The aqueous ink compositions Examples 1 to 13 according to the present invention will hereinafter be described. Aqueous inks insufficiently degassed were prepared as Comparative Examples. Comparative Examples 1 to 3 were each applied to the writing instrument shown in FIG. 1, and Comparative Examples 4 to 6 were each applied to the writing instrument shown in FIG. 2.

Example 1

An aqueous ink composition of Example 1 was prepared by using the following ingredients represented as parts by weight:

| | |
|---|---|
| Copper phthalocyanine blue | 4.0 parts |
| Sodium salt of styrene-acrylic acid copolymer (pigment dispersant) | 1.0 part |
| Diethylene glycol | 10.0 parts |
| Glycerin | 5.0 parts |
| Jumron PW-110 3% aqueous solution (neutralized with equivalent NaOH) | 6.0 parts |
| 1,2-Benzisothiazoline-3-on (antiseptic agent) | 0.5 parts |
| Polyoxyethylene nonyl phenyl ether (activation agent) | 0.5 parts |
| Benzotriazole (rust-preventive acent) | 0.2 parts |
| Xanthane gum (pseudo plasticity formation agent) | 0.3 parts |
| Water | 72.5 parts |

Xanthane gum was added little by little to 30 parts of water to avoid formation of undissolved lumps of xanthane gum, and was completely dissolved therein by stirring. A mixture of copper phthalocyanine blue, sodium salt of styrene-acrylic acid copolymer and 42.5 parts of water was stirred for dispersion for one hour by means of a sand mill. The remaining ingredients were added to the dispersion and dissolved therein by stirring. Then, the dispersion was added to the xanthane gum solution, and dispersed by stirring for one hour. After adjusting, the pH to 9 using caustic soda, theesultant dispersion was filtered and allowed to stand for 24 hours in a pressure vessel kept at a temperature of 20° C. and at a reduced pressure of 20 mmHg. Thus, a blue ink was obtained.

Example 2

| | |
|---|---|
| Carbon black | 4.0 parts |
| Sodium salt of styrene-acrylic acid copolymer (pigment dispersant) | 1.5 parts |
| Propylene glycol | 10.0 parts |
| Glycerin | 5.0 parts |
| Jumron PW-110 3% aqueous solution (neutralized with equivalent NaOH) | 7.0 parts |
| Sodium benzoate (antiseptic agent) | 1.0 part |
| Polyoxyethylene nonyl phenyl ether (activation agent) | 0.5 parts |
| Benzotriazole (rust-preventive agent) | 0.2 parts |
| Weran gum (pseudo plasticity formation agent) | 0.4 parts |
| Water | 70.4 parts |

Weran gum was added little by little to 30 parts of water to avoid formation of undissolved lumps of weran gum, and was completely dissolved therein by stirring. A mixture of carbon black, sodium salt of styrene-acrylic acid copolymer and 40.4 parts of water was stirred for dispersion for one hour by means of a sand mill. The remaining ingredients were added to the dispersion and dissolved therein by stirring. Then, the dispersion was added to the weran gum solution, and dispersed by stirring for one hour. After adjusting the pH % 9 using caustic soda, the resultant dispersion was filtered and allowed to stand for 24 hours in a pressure vessel kept at a temperature of 20° C. and at a reduced pressure of 20 mmHg. Thus, a black ink was obtained.

Example 3

| | |
|---|---|
| Lumicol NKW-2105 (colored emulsion pigment dispersion) | 40.0 parts |
| Glycerin | 5.0 parts |
| Propylene glycol | 10.0 parts |
| Junron PW-110 3% aqueous solution (neutralized with equivalent NaOH) | 3.0 parts |
| Sodium benzoate (antiseptic agent) | 1.0 part |
| Polyoxyethylene nonyl phenyl ether (activation agent) | 0.5 parts |
| Benzotriazole (rust-reventive agent) | 0.2 parts |
| Xanthane gum (pseudo plasticity formation agent) | 0.1 parts |
| Water | 40.2 parts |

Xanthane gum was added little by little to 30 parts of water to avoid formation of undissolved lumps of xanthane gum, and was completely dissolved therein by stirring. The remaining ingredients were mixed and completely dissolved by stirring. The mixture was added to the xanthane gum solution, and stirred for one hour. After adjusting the pH to 7 using caustic soda, the resultant mixture was filtered and allowed to stand for 24 hours in a pressure vessel kept at a temperature of 20° C. and at a reduced pressure of 20 mmHg. Thus, a fluorescent yellow ink was obtained.

Example 4

| | |
|---|---|
| Dioxazine violet | 4.0 parts |
| Sodium salt of styrene-acrylic acid copolymer (pigment dispersant) | 1.0 parts |
| Diethylene glycol | 10.0 parts |
| Glycerin | 5.0 parts |
| Junron PW-110 3% aqueous solution (neutralized with equivalent NaOH) | 6.0 parts |
| 1,2-Benziothiazoline-3-on (antiseptic agent) | 0.5 parts |
| Polyoxyethylene nonyl phenyl ether (activation agent) | 0.5 parts |
| Benzotriazole (rust-preventive agent) | 0.2 parts |
| Xanthane gum (pseudo plasticity formation agent) | 0.4 parts |
| Water | 72.4 parts |

Xanthane gum was added little by little to 30 parts of water to avoid formation of undissolved lumps of xanthane gum, and was completely dissolved therein by stirring. A mixture of dioxazine violet, sodium salt of styrene-acrylic acid copolymer and 42.4 parts of water was stirred for dispersion for one hour by means of a sand mill. The remaining ingredients were added to the dispersion and dissolved therein by stirring. Then, the dispersion was added to the xanthane gum solution, and dispersed by stirring for one hour. After adjusting the pH to 9 using caustic soda, the resultant dispersion was filtered and allowed to stand for 24 hours in a pressure vessel kept at a temperature of 20° C. and at a reduced pressure of 20 mmHg. Thus, a violet ink was obtained.

Example 5

| | |
|---|---|
| Quinacridone red | 4.0 parts |
| Sodium salt of styrene-acrylic acid copolymer (pigment dispersant) | 1.5 parts |
| Propylene glycol | 10.0 parts |
| Glycerin | 5.0 parts |
| Junron PW-110 3% aqueous solution (neutralized with equivalent NaOH) | 7.0 parts |
| Sodium benzoate (antiseptic agent) | 1.0 part |
| Polyoxyethylene nonyl phenyl ether (activation agent) | 0.5 parts |
| Benzotriazole (rust-preventive agent) | 0.2 parts |
| Weran gum (pseudo plasticity formation agent) | 0.3 parts |
| Water | 70.5 parts |

Weran gum was added little by little to 30 parts of water to avoid formation of undissolved lumps of weran gum, and was completely dissolved therein by stirring. A mixture of quinacridone red, sodium salt of styrene-acrylic acid copolymer and 40.5 parts of water was stirred for dispersion for one hour by means of a sand mill. The remaining ingredients were added to the dispersion and dissolved therein by stirring. Then, the dispersion was added to the weran gum solution, and dispersed by stirring for one hour. After adjusting the pH to 9 using caustic soda, the resultant dispersion was filtered and allowed to stand for 24 hours in a pressure vessel kept at a temperature of 20° C. and at a reduced pressure of 20 mmHg. Thus, a pink ink was obtained.

Example 6

| | |
|---|---|
| Lumicol NKW-2104 (colored emulsion pigment dispersion) | 40.0 parts |
| Glycerin | 5.0 parts |
| Propylene glycol | 10.0 parts |
| Junron PW-110 3% aqueous solution (neutralized with equivalent NaOH) | 1.0 part |
| 1,2-Benzisothiazoline-3-on (antiseptic agent) | 0.5 parts |
| Polyoxyethylene nonyl phenyl ether (activation agent) | 0.5 parts |
| Benzotriazol (rust preventive agent) | 0.2 parts |
| Xanthane gum (pseudo plasticity formation agent) | 0.1 parts |
| Water | 42.7 parts |

Xanthane gum was added little by little to 30 parts of water to avoid formation of undissolved lumps of xanthane gum, and was completely dissolved therein by stirring. The remaining ingredients were mixed and completely dissolved by stirring. The mixture was added to the xanthane gum solution, and stirred for one hour. After adjusting the pH to 7 using caustic soda, the resultant mixture was filtered and allowed to stand for 24 hours in a pressure vessel kept at a temperature of 20° C. and at a reduced pressure of 20 mmHg. Thus, a fluorescent orange ink was obtained.

Example 7

| | |
|---|---|
| Lumicol NKW-3007 (colored-emulsion pigment dispersion) | 40.0 parts |
| Glycerin | 15.0 parts |
| Sodium benzoate (antiseptic agent) | 1.0 part |
| Water | 44.0 parts |

After these ingredients were mixed and completely dissolved by stirring, the solution was filtered, and allowed to stand for 24 hours in a pressure vessel kept at a temperature of 20° C. and at a reduced pressure of 20 mmHg. Thus, a fluorescent pink ink was obtained.

Example 8

| | |
|---|---|
| Eosine (C. I. Acid Red 87) | 6.0 parts |
| Ethylene glycol | 15.0 parts |
| Glycerin | 10.0 parts |
| 1,2-Benziothiazoline-3-on (antiseptic agent) | 0.5 parts |
| Polyoxyethylene nonyl phenyl ether (activation agent) | 0.1 parts |
| Water | 68.4 parts |

After these ingredients were mixed and completely dissolved by stirring, the solution was filtered, and allowed to stand for 24 hours in a pressure vessel kept at a temperature of 20° C. and at a reduced pressure of 20 mmHg. Thus, a red ink was obtained.

Example 9

| | |
|---|---|
| Water Black R500 | 9.0 parts |
| Water Yellow No. 6 | 0.5 parts |
| Ethylene glycol | 10.0 parts |
| Glycerin | 5.0 parts |
| 1,2-Benziothiazoline-3-on (antiseptic agent) | 0.5 parts |
| Polyoxyethylene nonyl phenyl ether (activation agent) | 0.1 parts |
| Water | 74.9 parts |

After these ingredients were mixed and completely dissolved by stirring, the solution was filtered, and allowed to stand for 24 hours in a pressure vessel kept at a temperature of 20° C. and at a reduced pressure of 20 mmHg. Thus, a black ink was obtained.

Example 10

| | |
|---|---|
| Lumicol NKW-3007 (colored emulsion pigment dispersion) | 40.0 parts |
| Glycerin | 15.0 parts |
| PVP K-30 (water-soluble resin) | 1.0 part |
| Sodium benzoate (antiseptic agent) | 1.0 part |
| Water | 43.0 parts |

After these ingredients were mixed and completely dissolved by stirring, the solution was filtered, and allowed to stand for 24 hours in a pressure vessel kept at a temperature of 20° C. and at a reduced pressure of 20 mmHg. Thus, a fluorescent pink ink was obtained.

Example 11

| | |
|---|---|
| C. I. Acid Blue 9 | 6.0 parts |
| Ethylene glycol | 15.0 parts |
| Glycerin | 10.0 parts |
| 1,2-Benziothiazoline-3-on (antiseptic agent) | 0.5 parts |
| Polyoxyethylene nonyl phenyl ether (activation agent) | 0.1 parts |
| Water | 68.4 parts |

After these ingredients were mixed and completely dissolved by Stirring, the solution was filtered, and allowed to stand for 24 hours in a pressure vessel kept at a temperature of 20° C. and at a reduced pressure of 20 mmHg. Thus, a blue ink was obtained.

Example 12

| | |
|---|---|
| C. I. Acid Orange 56 | 4.0 parts |
| Ethylene glycol | 10.0 parts |
| Glycerin | 5.0 parts |
| 1,2-Benziothiazoline-3-on (antiseptic agent) | 0.5 parts |
| Polyoxyethylene nonyl phenyl ether (activation agent) | 0.1 parts |
| Water | 80.4 parts |

After these ingredients were mixed and completely dissolved by stirring, the solution was filtered, and allowed to stand for 24 hours in a pressure vessel kept at a temperature of 20° C. and at a reduced pressure of 20 mmHg. Thus, an orange ink was obtained.

Example 13

| | |
|---|---|
| Carbon black | 4.0 parts |
| Sodium salt of styrene-acrylic acid copolymer (pigment dispersant) | 1.5 parts |
| Propylene glycol | 10.0 parts |
| Glycerin | 5.0 parts |
| Junron PW-110 3% aqueous solution (neutralized with equivalent NaOH) | 7.0 parts |
| Sodium benzoate (antiseptic agent) | 1.0 part |
| Polyoxyethylene nonyl phenyl ether (activation agent) | 0.5 parts |
| Benzotriazole (rust-preventive agent) | 0.2 parts |
| Weran gum (pseudo plasticity formation agent) | 0.8 parts |
| Water | 70.0 parts |

Weran gum was added little by little to 30 parts of water to avoid formation of undissolved lumps of weran gum, and was completely dissolved therein by stirring. A mixture of carbon black, sodium salt of styrene-acrylic acid copolymer and 40.4 parts of water was stirred for dispersion for one hour by means of a sand mill. The remaining ingredients were added to the dispersion and dissolved therein by stirring. Then, the dispersion was added to the weran gum solution, and dispersed by stirring for one hour. After adjusting to the pH to 9 using caustic soda, the resultant dispersion was filtered and allowed to stand for 24 hours in a pressure vessel kept at a temperature of 20° C. and at a reduced pressure of 20 mmHg. Thus, a black ink was obtained.

Comparative Example 1

A blue ink was prepared in substantially the same manner as in Example 1, except that the filtered ink mixture was allowed to stand for 24 hours at a temperature of 20° C. under the atmospheric pressure.

Comparative Example 2

A blue ink was prepared in substantially the same manner as in Example 1, except that the filtered ink mixture was allowed to stand for 24 hours at a temperature of 20° C. at a pressure of 100 mmHg.

Comparative Example 3

A blue ink was prepared in substantially the same manner as in Example 1, except that the filtered ink mixture was allowed to stand for 24 hours at a temperature of 20° C. at a pressure of 300 mmHg.

Comparative Example 4

A fluorescent pink ink was prepared in substantially the same manner as in Example 7, except that the filtered ink mixture was allowed to stand for 24 hours at a temperature of 20° C. under the atmospheric pressure.

Comparative Example 5

A fluorescent pink ink was prepared in substantially the same manner as in Example 7, except that the filtered ink mixture was allowed to stand for 24 hours at a temperature of 20° C. at a pressure of 100 mmHg.

Comparative Example 6

A fluorescent pink ink was prepared in substantially the same manner as in Example 7, except that the filtered ink mixture was allowed to stand for 24 hours at a temperature of 20° C. at a pressure of 300 mmHg.

The viscosities of the aqueous ink compositions of Examples 1 to 13 and Comparative Examples 1 to 6 were measured at 25° C. by means of a BL viscometer (Brookfield type viscometer) available from TOKYO KEIKI CO. The viscosities of the inks of Examples 1 to 6 and 13 and Comparative Examples 1 to 3 were measured with a No. 3 rotor at 6 rpm, while those of Examples 7 to 12 and Comparative Examples 4 to 6 were measured with a No. 1 rotor at 60 rpm. The dissolved oxygen amounts of the inks of Examples 1 to 13 and Comparative Examples 1 to 6 were measured at 20° C. by means of a dissolved oxygen meter (OM-14) available from HORIBA, Ltd.

The aqueous ink compositions of Examples 1 to 6 and 13 and Comparative Examples 1 to 3 were each directly filled into an ink container tube 2 installed in an ink chamber 7 as shown in FIG. 1. The ink container tube 2 was made of polypropylene and had a length of 10 cm and an inner diameter of 4 mmΦ. Then, the tail end of the ink container tube 2 was stoppered with a back-flow preventive member 4. The back-flow preventive member 4 was made of a material obtained by gelatinizing a base material of polybutene with a gelatinizer. A pen tip 6 having a writing tip made of German silver fitted therein was attached to the leading end of the ink chamber 7. Thus, a writing instrument of the ink-free type having a confined ink chamber was fabricated, which is a refill-type writing instrument having substantially the same construction as an oil-based ball-point pen. In turn, the pen tip portion of the writing instrument was capped with a cap incorporating therein a silicone rubber. Subsequently, each writing instrument was centrifuged for deaeration of the ink.

After confirming by way of X-ray photography that there were no bubbles in the ink compositions in the respective writing instruments thus fabricated, the writing instruments were stored in a 50° C. constant temperature vessel for two weeks with the bodies thereof being laid. Then, the evolution of bubbles in the ink composition was examined by way of X-ray photography. Further, the writing instruments were tested by means of a writing tester after the two-week storage to check for writing defects such as uneven ink density and skips in a drawn line.

The aqueous ink compositions of Examples 7 to 12 and Comparative Examples 4 to 6 were each filled into an ink container 10 of a writing instrument as shown in FIG. 2 from the side of a back-flow preventive member 11 by means of a syringe taking care not to allow air to be entrapped therein. After confirming by way of X-ray photography that there were no bubbles in the ink compositions in the respective ink containers, the writing instruments were stored in a 50° C. constant temperature vessel for two weeks with the bodies thereof being laid. Then, the evolution of air in the ink compositions was examined by way of X-ray photography.

Further, the writing instruments were tested by means of a writing tester after the two-week storage to check for writing defects such as uneven ink density and skips in a drawn line.

The results are shown in Tables 1 and 2.

TABLE 1

| | Dissolved oxygen amount (mg/l) | Gas evolution after 2-week storage (50° C.) | Writing after 2-week storage (50° C.) | Viscosity of ink (cps) |
|---|---|---|---|---|
| Ex. 1 | 2.1 | NO | Normal | 6,000 |
| Ex. 2 | 0.9 | NO | Normal | 9,500 |
| Ex. 3 | 1.5 | NO | Normal | 1,500 |
| Ex. 4 | 3.0 | NO | Normal | 7,300 |
| Ex. 5 | 2.6 | NO | Normal | 6,800 |
| Ex. 6 | 0.7 | NO | Normal | 500 |
| Ex. 7 | 1.2 | NO | Normal | 7 |
| Ex. 8 | 1.5 | NO | Normal | 5 |
| Ex. 9 | 0.7 | NO | Normal | 4 |
| Ex. 10 | 2.5 | NO | Normal | 15 |
| Ex. 11 | 1.3 | NO | Normal | 6 |
| Ex. 12 | 0.9 | NO | Normal | 5 |
| Ex. 13 | 3.0 | NO | Normal | 17,000 |

TABLE 2

| | Dissolved oxygen amount (mg/l) | Gas evolution after 2-week storage (50° C.) | Writing after 2-week storage (50° C.) | Viscosity of ink (cps) |
|---|---|---|---|---|
| Com. Ex. 1 | 6.8 | 0.06 cc | Skips in drawn line | 6,000 |
| Com. Ex. 2 | 5.2 | 0.05 cc | Skips in drawn line | 6,000 |
| Com. Ex. 3 | 3.9 | 0.05 cc | Skips in drawn line | 6,000 |
| Com. Ex. 4 | 7.2 | 0.08 cc | Skips in drawn line | 7 |
| Com. Ex. 5 | 4.5 | 0.04 cc | Skips in drawn line | 7 |
| Com. Ex. 6 | 3.3 | 0.02 cc | Skips in drawn line | 7 |

As can be seen from Table 1, the evolution of air was not observed in the aqueous ink compositions of the present invention and the writing instruments charged with the aqueous ink compositions of the present invention did not cause any writing defect even after the writing instruments were kept at a high temperature. The present invention can be applied to aqueous ink compositions for ball-point pens having a viscosity of about 100 cps to about 20,000 cps (25° C.) and those having a viscosity of about 1 cps to about 20 cps (25° C.).

As described above, the aqueous ink compositions of Examples and Comparative Examples were tested under the conditions of a storage temperature of 50° C. and a storage period of two weeks which were adapted to simulate an average temperature change and time lapse. If actual conditions are less severe than the aforesaid simulating conditions, the amount of gas dissolved in the ink compositions may be greater than 3 mg/l as measured on the basis of dissolved oxygen amount at 20° C. The important point is that the amount of gas dissolved in the ink composition should be reduced to less than a saturation level.

What is claimed is:

1. An ink composition comprising a coloring agent, a water-soluble solvent and water, wherein the amount of gas dissolved therein is less than the amount of gas at the saturation level.

2. An ink composition as claimed in claim 1, wherein the amount of dissolved gas is not greater than about 3 mg/l as measured on the basis of the amount of dissolved oxygen gas at 20° C.

3. An ink composition as claimed in claim 1, further comprising a pseudo plasticity formation agent.

4. An ink composition as claimed in claim 1, wherein the viscosity of said composition is the range of from about 100 cps to about 20,000 cps as measured at 25° C.

5. An ink composition as claimed in claim 1, wherein the viscosity of said composition is the range of from about 1 cps to about 20 cps as measured at 25° C.

6. An ink composition as claimed in claim 1, wherein the coloring agent is a pigment.

7. An ink composition as claimed in claim 6, further comprising a pigment dispersant.

8. An ink composition as claimed in claim 6, said pigment being at least one selected from the group consisting of azo pigments, polyazo pigments, phthalocyanine pigments, quinacridone pigments, anthraquinone pigments, dioxazine pigments, indigo pigments, thioindigo pigments, perinone pigments, perylene pigments, melamine pigments, titanium dioxide, iron oxide and carbon black.

9. An ink composition as claimed in claim 1, wherein the coloring agent is a colored resin emulsion.

10. An ink composition as claimed in claim 6, wherein said pigment is present in an amount within the range of from about 1% to about 30% by weight based on total weight of the composition.

11. An ink composition as claimed in claim 9, wherein said colored resin emulsion is present in an amount within the range of from about 10% to about 50% by weight based on total weight of the composition.

12. A method of making an ink composition comprising mixing at least a coloring agent, a water-soluble organic solvent and water, and then permitting the mixture to stand at a reduced pressure for a period of time sufficient to reduce the amount of gas dissolved in the mixture to less than its saturation level.

13. A method as claimed in claim 12, wherein the amount of dissolved gas is not greater than about 3 mg/l as measured on the basis of the amount of dissolved oxygen gas at 20° C.

14. A method as claimed in claim 12, where instead of permitting the mixture to stand at a reduced pressure for a period of time sufficient to reduce the amount of gas dissolved in the mixture to less than its saturation level, a compound capable of chemically reacting with dissolved gases is added to the mixture to reduce the amount of gas dissolved in the mixture to less than its saturation level.

15. A method as claimed in claim 14, wherein the amount of dissolved gas is not greater than about 3 mg/l as measured on the basis of the amount of dissolved oxygen gas at 20° C.

16. A writing instrument comprising an ink container which includes an ink composition comprising at least a coloring agent, a water-soluble solvent and water, wherein the amount of gas dissolved in the ink composition is less than the amount of gas at a saturation level of the gas.

17. The writing instrument as claimed in claim 16, said instrument comprising:

an ink container is directly charged with said ink composition;

a back-flow preventive member fitted into a tail end of the ink container;

a pen tip attached at the leading end of the ink container;

a writing tip attached to an end of said pen tip; and an ink chamber disposed within said ink container.

18. The writing instrument as claimed in claim 17, said instrument comprising:

a back-flow preventive member which is fitted into a tail end of said ink container tube;

a pen tip disposed at an end opposite said tail end;

a valve chamber disposed within said ink container and adjacent said pen tip;

a valve mechanism provided on the pen tip side of said ink container tube for generating a negative pressure in said valve chamber to supply said ink composition to a pen tip and allow said back-flow preventive member to be displaced within said ink chamber toward said pen tip as the ink composition is consumed.

19. The writing instrument as claimed in claim 16, wherein the amount of dissolved gas is-not greater than about 3 mg/l as measured on the basis of the amount of dissolved oxygen gas at 20° C.

20. The writing instrument as claimed in claim 17, wherein said ink chamber is a confined structure that the interior of the ink chamber thereof is sealed off from the exterior and said back-flow preventive member to be displaced within said ink chamber toward said pen tip as the ink composition is consumed.

* * * * *